United States Patent
Kurita

[11] Patent Number: 6,148,687
[45] Date of Patent: Nov. 21, 2000

[54] STEERING COLUMN FOR AUTOMOTIVE VEHICLE

[75] Inventor: Haruhide Kurita, Shizuoka, Japan

[73] Assignee: Fuji Kiko Co., Ltd., Tokyo, Japan

[21] Appl. No.: 09/216,827

[22] Filed: Dec. 21, 1998

[30] Foreign Application Priority Data

Dec. 26, 1997 [JP] Japan ................................. 9-358669

[51] Int. Cl.[7] ....................................................... B62D 1/16
[52] U.S. Cl. ............................................. 74/492; 280/777
[58] Field of Search ............................ 74/491, 492, 493, 74/495; 280/777, 779

[56] References Cited

U.S. PATENT DOCUMENTS

| | | | |
|---|---|---|---|
| 5,181,435 | 1/1993 | Khalifa et al. | 74/492 |
| 5,228,720 | 7/1993 | Sato et al. | 280/777 |
| 5,700,032 | 12/1997 | Fukunaga | 280/775 |
| 5,769,454 | 6/1998 | Duval et al. | 280/777 |
| 5,824,348 | 10/1998 | Fujiu et al. | 425/120 |
| 5,875,686 | 3/1999 | Kinoshita et al. | 74/492 |
| 5,876,065 | 3/1999 | Ogura et al. | 280/777 |

*Primary Examiner*—David Fenstermacher
*Attorney, Agent, or Firm*—Foley & Lardner

[57] ABSTRACT

A steering column for an automotive vehicle, provided with an energy absorbing structure. The steering column comprises a jacket tube. A steering shaft is rotatably disposed through bearings inside the jacket tube. The steering shaft includes lower and upper shafts which are connected with each other through a connection using a resin, the resin being able to be sheared by an axial load over a predetermined level so as to allow an axial relative movement between the lower and upper shafts. An upper bracket is securely supported to a vehicle body of the automotive vehicle. The upper bracket includes generally parallel first and second support sections which are movable upon receiving an energy in an axial direction of the steering shaft so as to absorb the energy. The first and second support sections have respectively first and second openings. A distance bracket includes generally parallel first and second side wall sections between which a part of the jacket tube is securely supported. The first and second side wall sections are located between the first and second support sections of the upper bracket, the first and second wall sections having respectively first and second elongate holes. Each elongate hole has a predetermined length and has an axis which inclines relative to an axis of the steering shaft. Each elongate hole has a first end and a second end which is positioned rearward relative to the first end with respect to the vehicle body. The first end is positioned closer to the axis of the steering shaft than the second end. A bolt passes through the first and second openings of the upper bracket and the first and second elongate holes of the distance bracket so as to fix the distance bracket to the upper bracket. The bolt is normally located closer to the first end than to the second end of each elongate hole.

10 Claims, 7 Drawing Sheets

STEERING COLUMN FOR AUTOMOTIVE VEHICLE

BACKGROUND OF THE INVENTION

1. Field of the Invention

This invention relates to improvements in a steering column for an automotive vehicle, and more particularly to the improvements in an energy absorbing configuration of the steering column to accomplish reduction in an initial load in a secondary collision of the automotive vehicle.

2. Description of the Prior Art

In general, in an automotive vehicle, a steering column is located below an instrument panel within a passenger compartment and secured inclined relative to a vehicle body. The steering column is provided with an energy absorbing configuration to absorb an impact energy when an impact load is applied to a steering wheel in a vehicle collision, in order to prevent a vehicle occupant from being injured upon the occupant's collision against a steering wheel. A variety of such energy absorbing configurations have been hitherto proposed and put into practical use. Such energy absorbing configurations basically include a first structure in which the steering column can axially contract, a second structure in which a bracket for supporting the steering column to a vehicle body can slide and get off from the vehicle body, and a third structure in which the bracket for supporting the steering column to the vehicle body can make its plastic deformation such as partial bending or breakage in a state to be fixed to the vehicle body. The first structure is arranged, for example, as follows: The steering column includes a steering shaft which consists of a rod-shaped lower shaft, and a pipe-shaped upper shaft. The lower shaft is axially fitted in the upper shaft, in which a molded resin is interposed between the lower and upper shafts to secure them. The steering column can axially contract when the molded resin is sheared upon receiving impact energy of the vehicle occupant. Recently, combination of the first, second and third structures has been increasingly used.

Now, a secondary collision occurs in the vehicle collision so that the vehicle occupant moves forward in parallel with a vehicle cruising direction and strikes against the steering wheel. It has been known that an impact load applied to the steering wheel produces a component force along the axis of the steering column and another component force perpendicular to the steering column axis.

In this connection, drawbacks have been encountered in the conventional steering columns provided with the energy absorbing configurations, as set forth below. That is, when the steering column moves forward with respect to the vehicle body upon receiving the impact load, an energy absorbing action by the above-mentioned second or third energy absorbing structure and another energy absorbing action by the above-mentioned first energy absorbing structure are simultaneously made. As a result, there is a tendency that an initial load becomes high in an impact energy absorption process during the secondary collision.

BRIEF SUMMARY OF THE INVENTION

It is an object of the present invention to provide an improved steering column for an automotive vehicle, which can effectively overcome drawbacks encountered in conventional steering columns for automotive vehicles.

Another object of the present invention is to provide an improved steering column for an automotive vehicle, which can sharply lower an initial load in an impact energy absorption process during a secondary collision of a vehicle collision.

A further object of the present invention is to provide an improved steering column for an automotive vehicle, by which a time lag is produced between an energy absorbing action made by an energy absorbing structure and another absorbing action made by another energy absorbing structure, the both energy absorbing structures being formed separate in a steering shaft of the steering column.

An aspect of the present invention resides in a steering column for an automotive vehicle, which comprises a jacket tube. A steering shaft is rotatably disposed through bearings inside the jacket tube. The steering shaft includes lower and upper shafts which are connected with each other through a connection using a resin, the resin being able to be sheared by an axial load over a predetermined level so as to allow an axial relative movement between the lower and upper shafts. An upper bracket is securely supported to a vehicle body of the automotive vehicle and has an opening. The upper bracket takes an energy absorbing structure for absorbing an energy in an axial direction of the steering shaft. A distance bracket is securely supporting a part of the jacket tube. The distance bracket is formed with an elongate hole having a predetermined length and having an axis which inclines relative to an axis of the steering shaft. The elongate hole has a first end, and a second end which is positioned rearward relative to the first end with respect to the vehicle body. The first end is positioned closer to the axis of the jacket tube than the second end. Additionally, a bolt passes through the opening of the upper bracket and the elongate hole of the distance bracket so as to fix the distance bracket to the upper bracket. The bolt is normally located closer to the first end than to the second end of the elongate hole.

Another aspect of the present invention resides in a steering column for an automotive vehicle, comprising a jacket tube. A steering shaft is rotatably disposed through bearings inside the jacket tube. The steering shaft includes lower and upper shafts which are connected with each other through a connection using a resin, the resin being able to be sheared by an axial load over a predetermined level so as to allow an axial relative movement between the lower and upper shafts. An upper bracket is securely supported to a vehicle body of the automotive vehicle. The upper bracket includes generally parallel first and second support sections which are movable upon receiving an energy in an axial direction of the steering shaft so as to absorb the energy. The first and second support sections have respectively first and second openings. A distance bracket includes generally parallel first and second side wall sections between which a part of the jacket tube is securely supported. The first and second side wall sections are located between the first and second support sections of the upper bracket, the first and second wall sections having respectively first and second elongate holes. Each elongate hole has a predetermined length and has an axis which inclines relative to an axis of the steering shaft. Each elongate hole has a first end, and a second end which is positioned rearward relative to the first end with respect to the vehicle body. The first end is positioned closer to the axis of the steering shaft than the second end. A bolt passes through the first and second openings of the upper bracket and the first and second elongate holes of the distance bracket so as to fix the distance bracket to the upper bracket. The bolt is normally located closer to the first end than to the second end of each elongate hole.

With the above steering column, in the secondary collision of a vehicle collision, when the vehicle occupant collides against the steering wheel, the steering column is assumed to move forward in parallel with a vehicle cruising direction under the load of the vehicle occupant. Consequently, the distance bracket moves forward with respect of the vehicle body through the elongate hole through which the bolt is passed, in a state where the upper bracket is left as it is. As a result, the resin (as a part of an energy absorbing structure) in the connection between the upper and lower shafts of the steering shaft is sheared to allow an axial relative movement between the lower and upper shafts, before another energy absorbing structure formed in the upper bracket functions to exhibit its energy absorbing action. Thus, a time lag is produced between the actions of the two separate energy absorbing structures in the steering column, thereby suppressing at a low value the initial load in the secondary collision of the vehicle collision. It is to be noted that such remarkable advantageous effects can be obtained merely by utilizing such a simple configuration as to form the inclined elongate hole in the distance bracket.

DETAILED DESCRIPTION OF THE INVENTION

Figure 2:
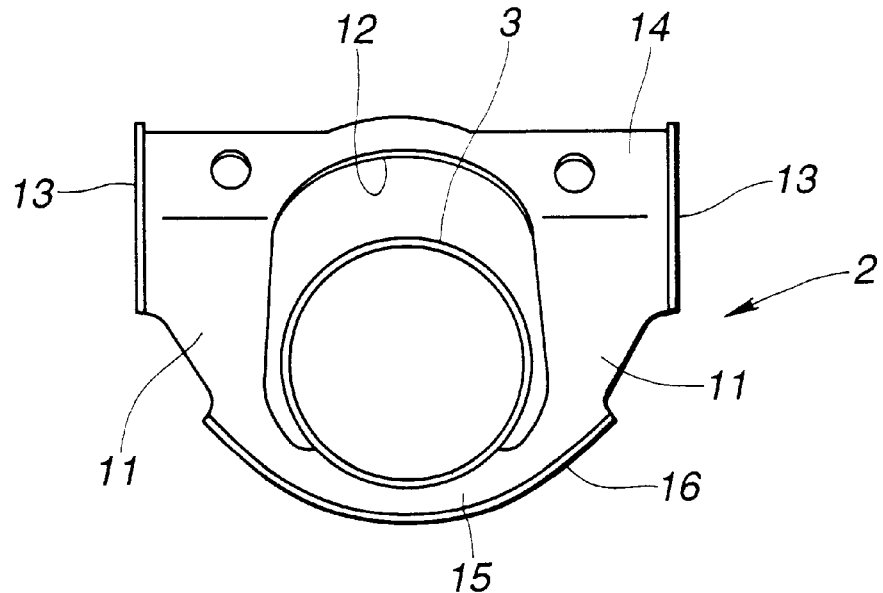
FIG. 2 is a front view, partly in section, of a lower bracket of the steering column, as viewed from a direction of an arrow A in FIG. 1.
Figure 3:
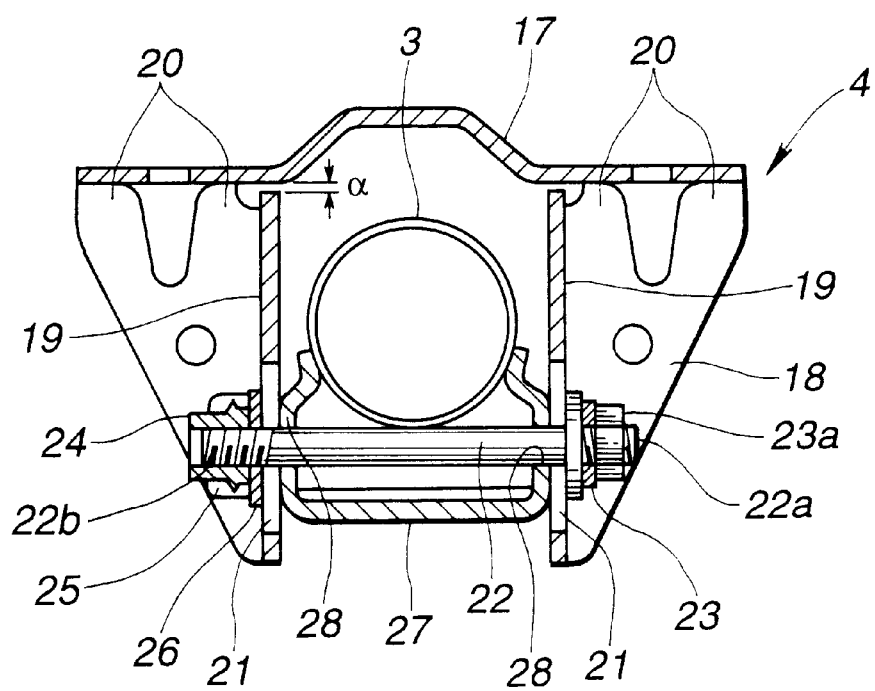
FIG. 3 is a view of an upper bracket of the steering column, taken in the direction of arrows substantially along the line B-B of FIG. 1.
Figure 4:
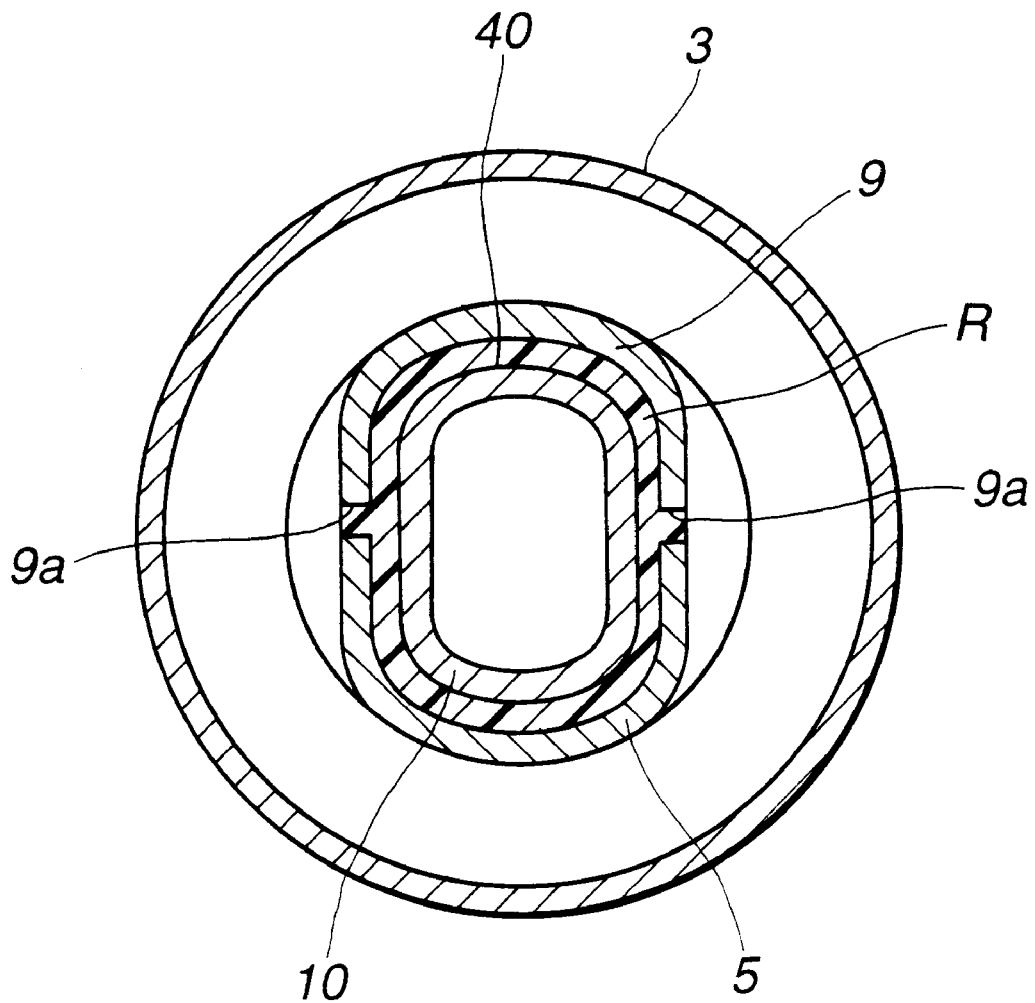
FIG. 4 is a sectional view taken in the direction of arrows substantially along the line D—D of FIG. 1.

Referring now to FIGS. 1 to 6 of the drawings, an embodiment of a steering column for an automotive vehicle is illustrated by the reference numeral 1. The steering column 1 comprises a jacket tube 3 which is provided at its longitudinal central section with an upper bracket 4 and at its lower end section with a lower bracket 2. A steering shaft 5 is disposed inside the jacket tube 3 in a manner to extend along the axis of the jacket tube 3. A steering wheel (not shown) is connected to an upper end section of the steering shaft 5. An intermediate shaft 6 to be connected to a steering gear unit (not shown) is connected through a universal joint type coupling (not identified) to a lower end section of the steering shaft 5. A bearing 7 is fixed inside the upper end section of the jacket tube 3. The lower end section of the jacket tube 3 is bulged so as to be increased in inner diameter. A bearing 8 is disposed inside the jacket tube 3 at a position immediately above the bulged lower end section. The steering shaft 5 is rotatably supported by the bearings 7, 8 which are separate from each other. The steering shaft 5 includes an upper shaft 9 which has a lower portion which has an inner peripheral surface which is generally oval in cross-section as seen in FIG. 4. The upper end section of the upper shaft 9 projects from the upper end of the jacket tube 3. The steering shaft 5 further includes a lower shaft 10 which is aligned with the upper shaft 9 and has a generally oval cross-section in its outer peripheral surface as seen in FIG. 4. The upper end section of the lower shaft 10 is fitted into the lower end section of the upper shaft 9 throughout a predetermined length thereby constituting a fitting connection part (no numeral).

In this fitting connection part, the lower shaft 10 is formed at its outer peripheral surface with peripheral grooves 40, 40, while the upper shaft 9 is formed with small through-holes 9a, 9a each of which is axially coincident with each of the peripheral groove 40, as shown in FIG. 4. In production of the steering column 1, a resin or plastic R is filled through the small through-holes 9a, 9a of the upper shaft 9 into the peripheral grooves 40, 40 of the lower shaft 10, so that the upper shaft 9 and the lower shaft 10 are fixed integral with each other when the resin is solidified in the state shown in FIG. 4. It will be understood that when an axial load over the predetermined level is input, the resin R filled in the through-holes 9a is sheared so as to make a telescopic movement between the upper and lower shafts 9, 10, thereby accomplishing contraction of the steering shaft 5.

As shown in FIG. 2, the lower bracket 2 is formed of a steel plate or sheet and has a large opening 12 in which the jacket tube 3 is disposed or loosely fitted in a manner to extend through the steel plate to form a generally crescentic space between the outer periphery of the jacket tube 3 and the inner periphery of the lower bracket 2 which periphery defines the opening 12. The steel plate of the upper peripheral section of the lower bracket 2 is bent to be inclined rearward to form a body installation section 14 to be connected to a vehicle body (not shown). The body installation section 14 is provided at its left- and right-side end sections with reinforcement flanges 13, 13 each of which is formed by bending the left- or right-side end section at right angles, so that each reinforcement flange 13 is perpendicular to the main body of the steel plate. The jacket tube 3 is welded at its outer peripheral surface with an inner peripheral section of the lower bracket 2 defining the opening 12 in such a manner that the jacket tube 3 is perpendicular to the main body of the steel plate of the lower bracket 2. A part of a lower peripheral section 15 of the steel plate of the lower bracket 2 is bent upwardly at right angles to form a reinforcement flange 16 which is located below the inner peripheral section at which the jacket tube 3 is welded. It is to be noted that the intermediate side sections 11 of the steel plate of the lower bracket 2 is able to make its elastic bending deformation so as to cope with a tilt operation of the steering column 1. In other words, when the steering column 1 is tilted, the intermediate side sections deform to be slightly bent to allow the tilt movement of the steering column 1. It will be understood that a tilting angle of the steering column 1 is not so large while the lower bracket 2 is elastically deformable, and therefore no breakage will occur in the lower bracket 2.

Figure 1:
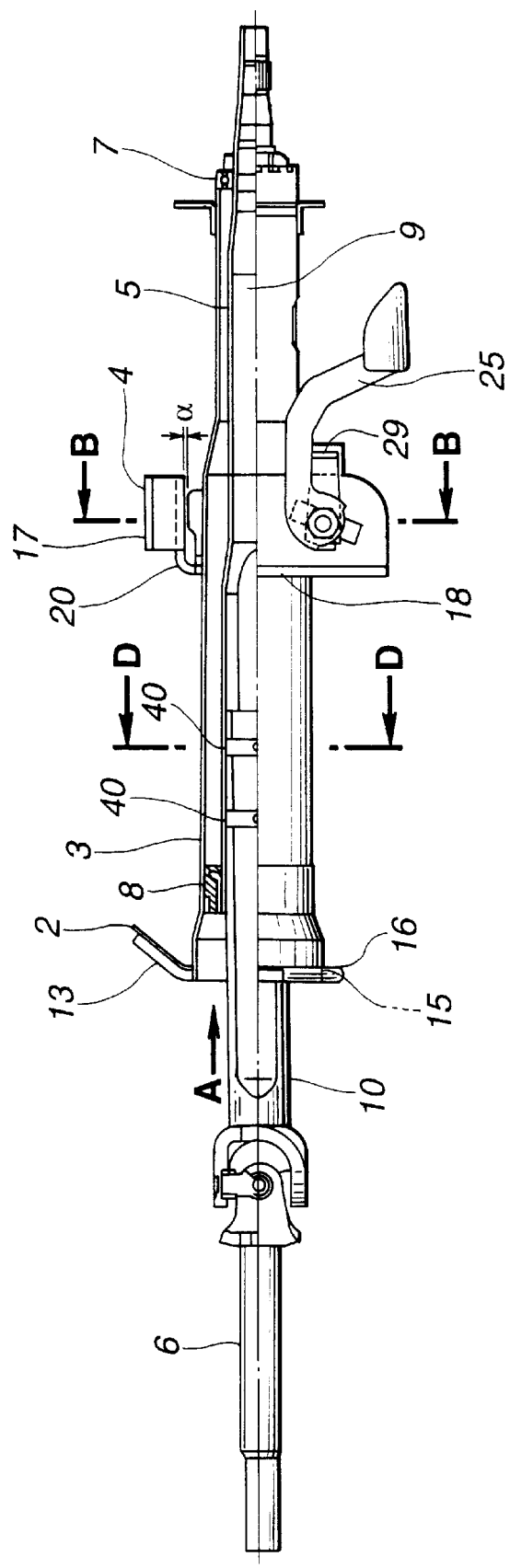
FIG. 1 is a side view, partly in section, of an embodiment of a steering column according to the present invention.
Figure 5:
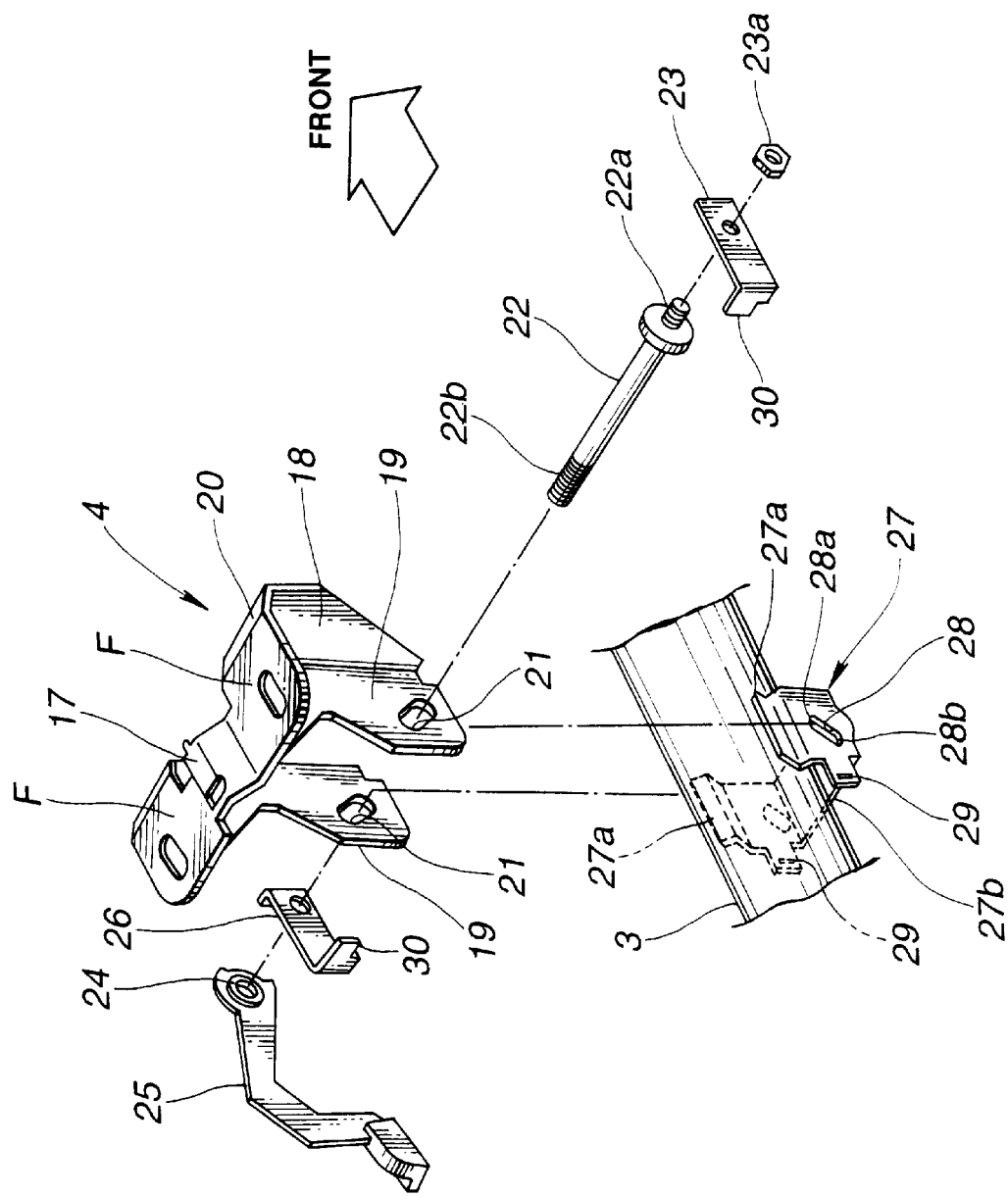
FIG. 5 is an exploded perspective view of the upper bracket of the steering column.
Figure 6:
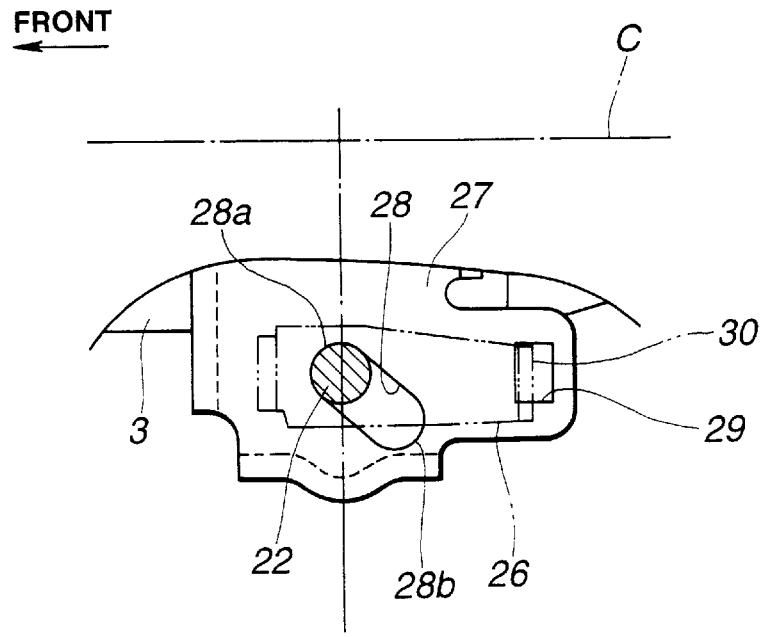
FIG. 6 is a fragmentary side view showing an essential part of the distance bracket.

As shown in FIGS. 3 and 5, the upper bracket 4 is formed of a steel plate or sheet and includes a body installation section 17 which is connected to the vehicle body. Front wall or support sections 18, 18 extend from the opposite sides (the right and left side portions F, F) of the front portion of the body installation section 17 in such a manner as to be perpendicular to the installation section 17. Column installation sections 19, 19 extend respectively from the inside portions of the front wall sections 18, 18 and perpendicular to the front wall sections 18, 18 or in a direction along the axis of the jacket tube 3, in which the jacket tube 3 is located between the opposite column installation sections 19, 19. The body installation section 17, the wall sections 18, 18 and the column installation sections 19, 19 are formed integral with each other to form a one-piece structure. A smooth or rounded bent section 20 is formed between each side portion F of the installation section 17 and each front wall section 18 as shown in FIG. 1, in which the bent section 20 has a predetermined curvature. The bent section 20 can be deformed under a load over a predetermined level. A clearance α is formed between the installation section 17 and the upper end edge of each column installation section 19 as shown in FIGS. 1 and 3.

The column installation sections 19, 19 are formed respectively with elongate tilt openings 21, 21 which extend generally vertically. A tilt bolt 22 is passed through these tilt openings 21, 21 and has a head section 22a at which a stopper 23 is secured with a nut 23a. The tile bolt 22 has a threaded section 22b which are located generally opposite to the head section 22a. A tilt nut 24 is engaged with the threaded section 22b and fixed to a tilt lever 25. A stopper 26 is mounted on the tilt bolt 22 and interposed between the tilt nut 24 and the column installation section 19. Each of the stoppers 23, 26 has a bent end portion 30 which is formed by bending the tip end portion of the stopper at right angles.

A distance bracket 27 having a generally C-shaped cross-section is welded to the lower surface of the jacket tube 3. The distance bracket 27 has generally parallel side wall sections 27a, 27a which are connected with each other by a floor wall section 27b, in which the side wall sections 27a, 27a are welded to the lower surface of the jacket tube 3. The distance bracket 27 is disposed between the column installation sections 19, 19 in such a manner that the side wall sections 27a, 27a are respectively in contact with the column installation sections 19, 19. The side wall sections 27a, 27a are formed respectively with elongate through-holes 28, 28 each of which has a predetermined length and has first and second opposite rounded ends 28a, 28b. The first rounded end 28a is positioned forward relative to the second rounded end 28b in a fore-and-aft direction of a vehicle body (not shown) of the automotive vehicle. The tilt bolt 22 is passed through these elongate through-holes 28, 28 as show in FIGS. 3, 5 and 6, while the tilt bolt is passed through the tilt openings 21, 21 so that the distance bracket 27 is generally vertically movable, constituting a tilt mechanism of the steering column 1. Each elongate through-hole 28 has an axis (not shown) which inclines relative to an axis C of the steering column 1 or of the steering shaft 5 in such a manner that the first rounded end 28a is positioned above relative to the second rounded end 28b with respect to the steering column axis C.

Figure 7:
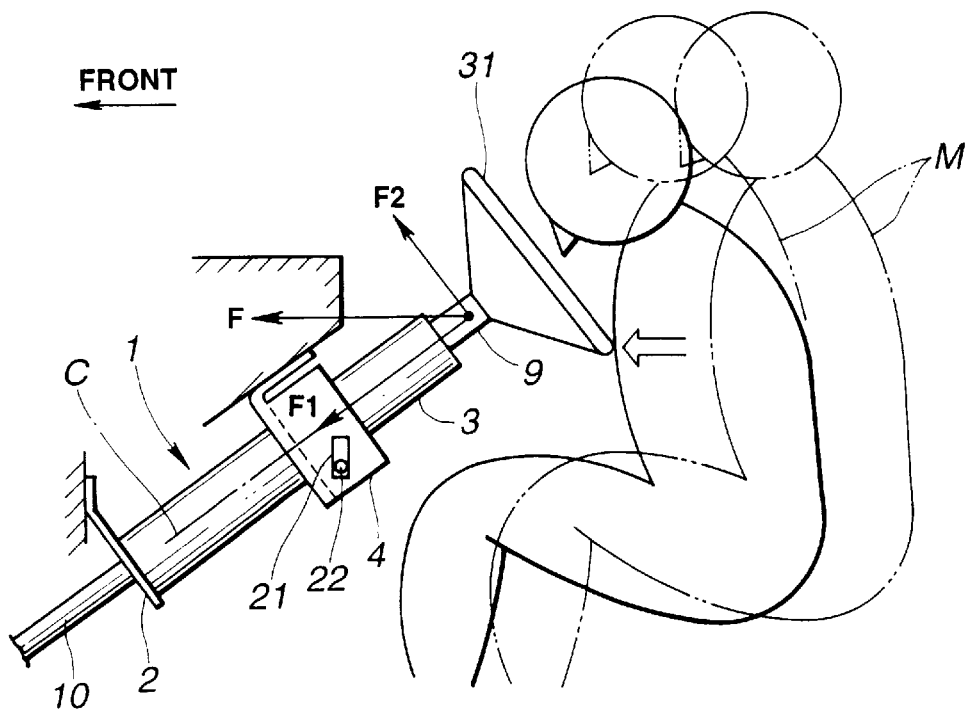
FIG. 7 is a schematic illustration showing a secondary collision in connection with the steering column of FIG. 1.

In other words, the axis of each elongate through-hole 28 inclines forward in the fore-and-aft direction of the vehicle body relative to a direction perpendicular to the steering column axis C, in which the first rounded end 28a located on the frontward side of the vehicle body is located above the second rounded end 28b located on the rearward side of the vehicle body. As a result of this arrangement of the elongate-holes 28, 28, as shown in FIG. 7, the tilt bolt 22 can move in each elongate through-hole 28 along the axis of the elongate through-hole 28 under the action of a component force F2 of an impact load F, so that the jacket tube 3 of the steering column 1 can move to the frontward side of the vehicle body. At this time, the movement of the jacket tube 3 in the axial direction of the steering column 1 is made by virtue of the arrangement in which the axis of each elongate through-hole 28 inclines forward in the fore-and-aft direction of the vehicle body relative to the direction perpendicular to the steering column axis C.

It will be appreciated that it is preferable that the tilt bolt 22 is normally positioned close to or contacting with the first rounded end 28a on the frontward side of the vehicle body. In order to accomplish this arrangement, the bent end portion 30 of the stopper 23 is inserted and engaged with a rectangular opening 29 formed in the side wall section 27a of the distance bracket 27. Additionally, the bent end portion 30 of the stopper 26 is similarly inserted and engaged with a rectangular opening 29 formed in the other side wall section 27a. Thus, the tilt bolt 22 is normally positioned close to or contacting the first rounded end 28a located closer to the steering column axis C than the second rounded end 28b. Accordingly, the tilt bolt 22 is normally fixed at a predetermined position relative to the distance bracket 27, and therefore no trouble occurs when a tilt of the steering column 1 is set.

Next, a manner of operation of the steering column 1 will be discussed.

First, the tilt operation of the steering column 1 will be explained.

When the tilt lever 25 is turned downward to rotate the tilt nut 24, a tightening action of the column installation sections 19, 19 to the distance bracket 27 under the action of the tilt nut 24 and the head section 22a of the tilt bolt 22 is loosened, and therefore the distance bracket 27 becomes movable in both the generally upward and downward directions. Then, the jacket tube 3 is tilted through the steering wheel to take a desired inclined state, in which the jacket tube 3 can be rotationally moved generally vertically around a position at which the jacket tube 3 is welded to the inner peripheral section of the steel plate of the lower bracket 2. It will be understood that the lower bracket 2 is prevented from being broken because the maximum angle of tilting of the jacket tube 3 is small while the lower bracket 2 makes its elastic deformation.

When the tilt lever 25 is restored to its original position, the jacket tube 3 is locked to keep the above inclined or tilted state. In other words, the distance bracket 27 is put between the column installation sections 19, 19 under pressure developed between the head section 22a of the tilt bolt 22 and the tilt nut 24. As a result, the distance bracket 27 is fixed between the column installation sections 19, 19 under friction.

Subsequently, the shock absorbing function of the steering column 1 in a vehicle collision will be explained.

At a primary collision in a head-on collision, the front-side parts of the vehicle body move rearward, and therefore the jacket tube 3 is moved rearward in the vehicle body. In this case, the front wall sections 18, 18 of the upper bracket 4 are pushed rearward so that the upper end edge of the column installation sections 19, 19 moves toward the installation section 17 reducing the clearance α and finally comes into contact with the lower surface of the installation section 17. Thus, a rearward movement of the jacket tube 3 is stopped.

Figure 8:
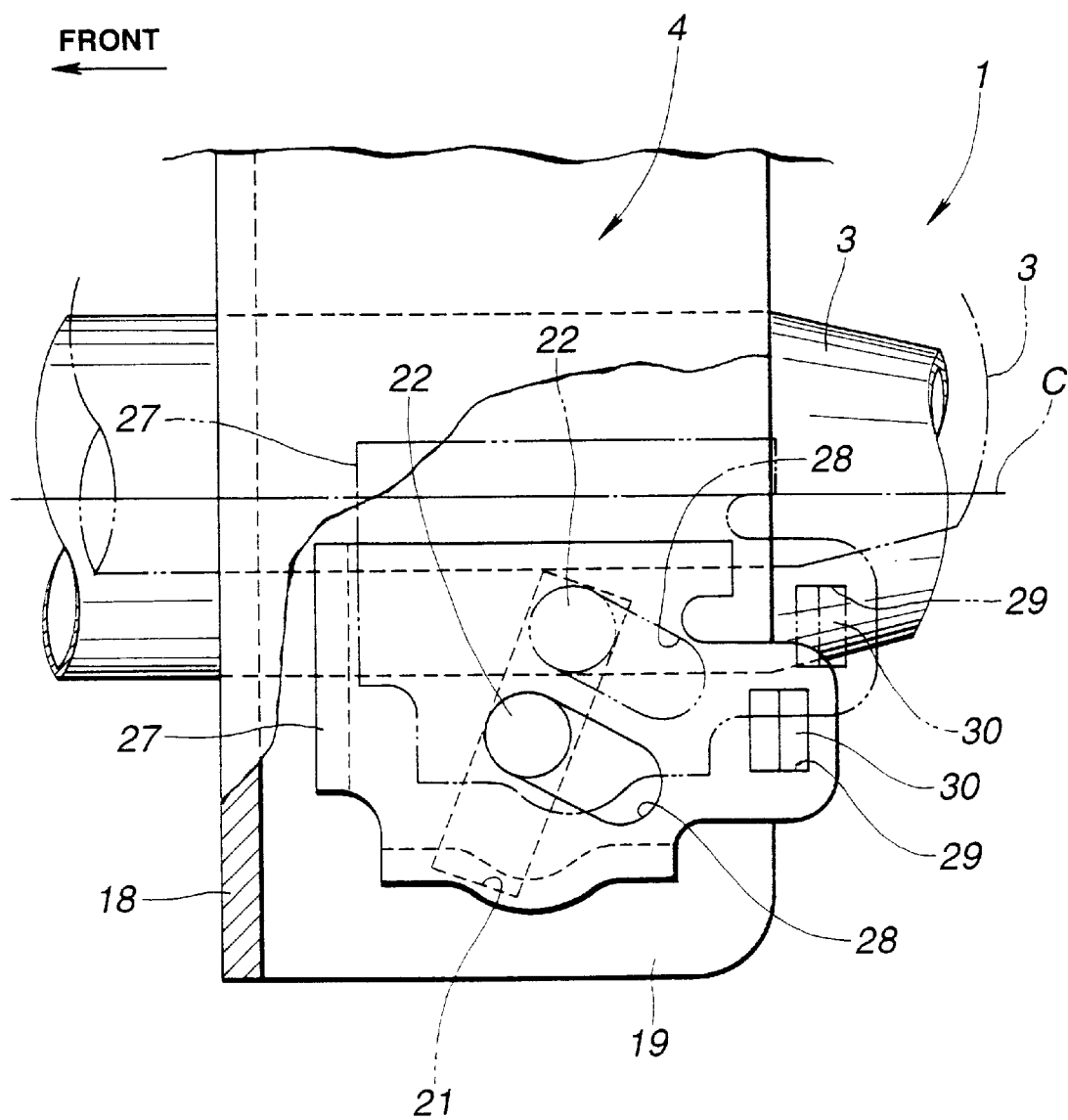
FIG. 8 is a fragmentary side view of the upper bracket, showing an operational mode of a distance bracket incorporated with the upper bracket.

At a secondary collision following the primary collision, when the load of a driver or vehicle occupant M is applied to the steering wheel 31 as shown in FIG. 7, the load F input parallel with a direction in which the vehicle cruises produces a component force F1 along the steering column axis C and another component force F2 perpendicular to the steering column axis C. Under the action of the component force F2, the steering column 1 is to be turned upwardly around the lower bracket 2. Since the component force F2 is normally larger than a fixing force due to the tilt bolt 22, the tilt bolt 22 moves to the upper end of the elongate tilt opening 21 and is stopped relative to the upper bracket 4 as shown in FIG. 8.

Figure 9:
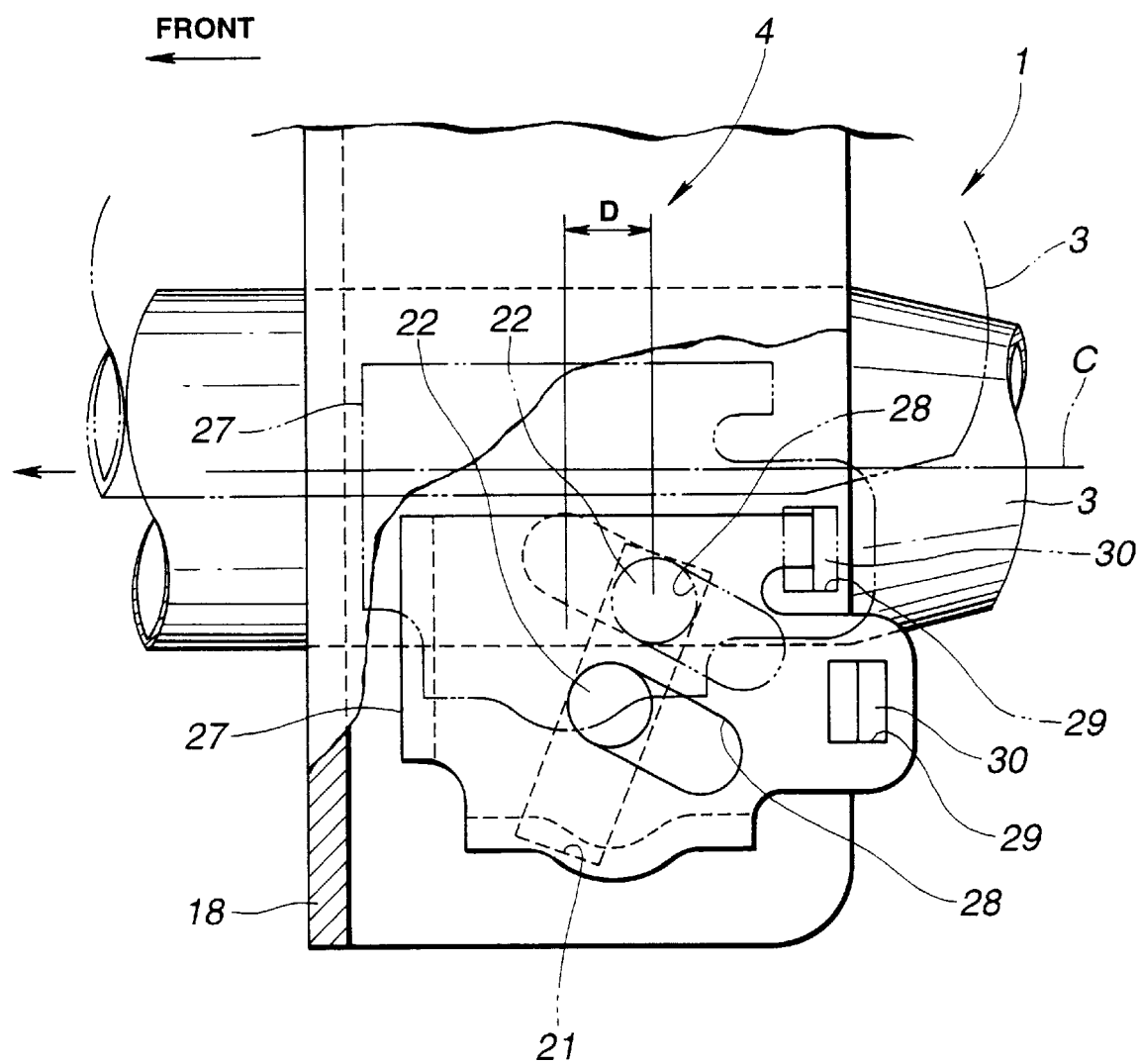
FIG. 9 is a fragmentary side view similar to FIG. 8 but shows another operational mode of the distance bracket, following the operational mode of FIG. 8.

After the tilt bolt 22 has moved to the upper end of the elongate tilt opening 21, the distance bracket 27 moves from the upper rounded end 28a to the lower rounded end 28b of the elongate through-hole 28 as shown in FIG. 9, in which the upper shaft 9 is forced to the lower shaft 10 by a moving amount of the distance bracket 27 in the direction of the steering column axis C so that the resin R filled in the small through-holes 9a of the upper shaft 9 is sheared. At this time, the bent end portions 30, 30 of the stoppers 23, 26 come out of the rectangular openings 29, 29 of the distance bracket 27 or deform so as to allow the jacket tube 3 to move downward.

Then, under the action of the component force F1, the front wall sections 18, 18 and the column installation sections 19, 19 of the upper bracket 4 are turned forward with respect to the vehicle body around the bend sections 20, 20 while the lower bracket 2 is deformed. It will be understood that the energy of the load F can be absorbed upon forward turning of parts of the upper bracket 4 with respect to the vehicle body.

Thus, by utilizing the component force F2 which is produced in the secondary collision and perpendicular to the steering column axis C, shearing action is made on the resin (R) connection between the upper shaft 9 and the lower shaft 10 through the inclined elongate through-holes 28 (of the distance bracket 27) through which the tilt bolt 22 passes, before the parts of the upper bracket 4 are bent around the bent sections 20. This causes a time lag between the shearing of the resin connection and the initiation of deformation of the upper bracket 4, thereby accomplishing lowering the initial load applied to the steering column 1.

While the steering column of the above embodiment has been shown and described as being provided with a tilt mechanism by which the steering wheel is vertically adjustable, it will be understood that the principle of the present invention may be applied to steering columns provided with no tilt mechanism. In such a case, the tilt through-holes 21 of the upper bracket 4 are formed circular so as to prevent the tilt bolt 22 from moving relative to the upper bracket 4. Besides, although the upper bracket 4 itself has been shown and described as being configured to be provided with an energy absorbing structure for absorbing a forward energy in the direction of the steering column axis C, such an energy absorbing structure may be provided separate from the upper bracket 4.

As appreciated from the above, according to the above embodiment, in the secondary collision of the vehicle collision, the steering shaft can be moved forward with respect to the vehicle body by utilizing the inclined elongate through-hole through which the tilt bolt is passed. Consequently, the resin (as a part of an energy absorbing structure) in the axial connection between the upper and lower shafts of the steering shaft is sheared to break the connection, before another energy absorbing structure formed in the upper bracket functions to exhibit its energy absorbing action. Thus, a time lag is produced between the actions of the two separate energy absorbing structures in the steering column, thereby suppressing at a low value the initial load in the secondary collision of the vehicle collision. It will be understood that such remarkable advantageous effects can be obtained merely by utilizing such a simple configuration as to form the inclined elongate through-holes in the distance bracket.

What is claimed is:

1. A steering column for use in an automotive vehicle having a vehicle body with a front end and a rear end, comprising:

a jacket tube;

a steering shaft rotatably disposed through bearings inside said jacket tube, said steering shaft including lower and upper shafts which are connected with each other through a connection using a resin, the resin being able to be sheared by an axial load exceeding a predetermined level so as to allow an axial relative movement between said lower and upper shafts;

an upper bracket having an attachment portion for secure attachment to the vehicle body of the automotive vehicle and having an opening, said upper bracket having an energy absorbing structure for absorbing energy in an axial direction of said steering shaft;

a distance bracket securely supporting a part of said jacket tube, said distance bracket being formed with an elongate hole having a predetermined length and having an axis which inclines relative to an axis of said steering shaft, said elongate hole having a first end, and a second end which is positioned rearward relative to said first end with respect to the vehicle body, said first end being positioned closer to the axis of said steering shaft than said second end; and a bolt passing through said opening of said upper bracket and said elongate hole of said distance bracket so as to fix said distance bracket to said upper bracket, said bolt in its normal position being located closer to said first end than to said second end of said elongate hole.

2. A steering column as claimed in claim 1, further comprising a stopper for normally fixing said bolt at a position closer to said first end than to said second end of said elongate hole, said stopper being fixedly interposed between said bolt and a part of said distance bracket, said stopper being deformable upon receiving said axial load.

3. A steering column as claimed in claim 1, wherein said bolt is circular in cross-section, wherein each of said first and second ends of said elongate hole of said distance bracket is formed rounded to have a semicircular shape.

4. A steering column as claimed in claim 1, further comprising a steering wheel tilt mechanism associated with said upper bracket, and wherein said tilt mechanism comprises said opening in said upper bracket being elongated to permit movement of said bolt relative to said upper bracket.

5. A steering column according to claim 1, wherein said automotive vehicle further comprises a lower bracket having an attachment portion for secure attachment to the vehicle body of the automotive vehicle and having an opening for receiving said jacket tube, said lower bracket having an energy-absorbing structure for absorbing energy in an axial direction of said steering shaft.

6. A steering column for use in an automotive vehicle having a vehicle body with a front end and a rear end, comprising;

a jacket tube;

a steering shaft rotatably disposed through bearings inside said jacket tube, said steering shaft including lower and upper shafts which are connected with each other through a connection using a resin, the resin being able to be sheared by an axial load exceeding a predetermined level so as to allow an axial relative movement between said lower and upper shafts;

an upper bracket having an attachment portion for secure attachment to the vehicle body of the automotive vehicle, said upper bracket including generally parallel first and second support sections which are movable upon receiving energy in an axial direction of said steering shaft so as to absorb the energy, said first and second support sections having respectively first and second openings;

a distance bracket including generally parallel first and second side wall sections between which a part of said jacket tube is securely supported, said first and second side wall sections being located between said first and second support sections of said upper bracket, said first and second wall sections having respectively first and second elongate holes, each elongate hole having a predetermined length and having an axis which inclines relative to an axis of said steering shaft, each elongate hole having a first end, and a second end which is positioned rearward relative to said first end with respect to the vehicle body, said first end being positioned closer to the axis of said steering shaft than said second end; and a bolt passing through said first and second openings of said upper bracket and said first and second elongate holes of said distance bracket so as to fix said distance bracket to said upper bracket, said bolt in its normal position being located closer to said first end than to said second end of each elongate hole.

7. A steering column according to claim 6, wherein said automotive vehicle further comprises a lower bracket having an attachment portion for secure attachment to the vehicle body of the automotive vehicle and having an opening for receiving said jacket tube, said lower bracket having an energy absorbing structure for absorbing energy in an axial direction of said steering shaft.

8. A steering column for use in an automotive vehicle having a vehicle body with a front end and a rear end, comprising:

a jacket tube;

a steering shaft rotatably disposed through bearings inside said jacket tube, said steering shaft including comprising a first energy-absorbing structure comprised of lower and upper shafts which are connected with each other through a connection using a resin, the resin being able to be sheared by an axial load exceeding a predetermined level so as to allow an axial relative movement between said lower and upper shafts;

an upper bracket having an attachment portion for secure attachment to the vehicle body of the automotive vehicle and having an opening;

a second energy-absorbing structure associated with said steering shaft for absorbing energy in an axial direction of said steering shaft;

means, including a distance bracket securely supporting a part of said jacket tube, for creating a time lag between initiation of energy absorption by one of the first and second energy-absorbing structures and initiation of energy absorption of the other of said energy-absorbing structures in response to an impact; and a bolt passing through said opening of said upper bracket and said distance bracket so as to fix said distance bracket to said upper bracket.

9. A steering column as claimed in claim 8, wherein said time lag creating means comprises said distance bracket being formed with an elongate hole having a predetermined length and having an axis which inclines relative to an axis of said steering shaft, said elongate hole having a first end, and a second end which is positioned rearward relative to said first end with respect to the vehicle body, said first end being positioned closer to the axis of said steering shaft than said second end, and wherein said bolt passes through said elongate hole and said bolt in its normal position is located closer to said first end than to said second end of said elongate hole.

10. A steering column as claimed in claim 8, wherein said second energy-absorbing structure is associated with said upper bracket.

\* \* \* \* \*